United States Patent [19]  
Nakauchi et al.

[11] 4,086,211  
[45] Apr. 25, 1978

[54] METHOD OF PRODUCING POLYURETHANE PRODUCTS HAVING AN IMPROVED FLEX CRACK RESISTANCE

[75] Inventors: Hideo Nakauchi; Toshiyuki Osaki, both of Higashi-Murayama; Kazuo Naito; Sakae Inoue, both of Kodaira, all of Japan

[73] Assignee: Bridgestone Tire Company Limited, Tokyo, Japan

[21] Appl. No.: 667,069

[22] Filed: Mar. 15, 1976

[30] Foreign Application Priority Data

Mar. 14, 1975 Japan .................................. 50-30214

[51] Int. Cl.² ...................... C08G 18/82; C08G 18/32
[52] U.S. Cl. ........................ 260/75 NA; 260/2.5 AY; 260/75 NH; 260/75 NP; 260/77.5 AM; 528/483; 528/503
[58] Field of Search ....... 260/75 NP, 75 NA, 75 NE, 260/77.5 AH, 77.5 A, 77.5 AM; 528/483, 503

[56] References Cited

U.S. PATENT DOCUMENTS

| | | | |
|---|---|---|---|
| 2,741,800 | 4/1956 | Brockway | 260/75 NP |
| 2,850,467 | 9/1958 | Livingood | 260/75 NE |
| 3,190,857 | 6/1965 | Fauser et al. | 260/75 NE |
| 3,403,721 | 10/1968 | Robius et al. | 260/77.5 AA |
| 3,789,032 | 1/1974 | Hoeschele | 260/75 NA |
| 3,980,606 | 9/1976 | Werner | 260/77.5 AM |

OTHER PUBLICATIONS

The Vanderbilt Rubber Handbook, R. T. Vanderbilt Co., Inc., New York, N.Y., (1968), pp. 208–213.
Wright & Cumming — Solid Polyurethane Elastomers, Maclaren & Sons, London, 1969, pp. 207–222.

*Primary Examiner*—H.S. Cockeram
*Attorney, Agent, or Firm*—Sughrue, Rothwell, Mion, Zinn and Macpeak

[57] ABSTRACT

Polyurethane products having improved flex crack resistance can be obtained by curing a mixture of (a) a polyurethane prepolymer having terminal isocyanate group and (b) at least one curative selected from polyamine and polyol to prepare a polyurethane product, and heat treating the polyurethane product at a temperature of 60°–180° C for 1–30,000 minutes under an atmosphere having an absolute humidity of at least 2%.

7 Claims, No Drawings

METHOD OF PRODUCING POLYURETHANE PRODUCTS HAVING AN IMPROVED FLEX CRACK RESISTANCE

BACKGROUND OF THE INVENTION

1. Field of the Invention

The present invention relates to a method for improving the flex crack resistance, cut resistance and tear strength of polyurethane products.

2. Description of the Prior Art

Polyurethane has high strength, abrasion resistance and weather resistance, and the use of polyurethane has remarkably increased in recent years. Particularly, casting type polyurethane is widely used due to its processability in the liquid state. However, polyurethane is insufficient in flex crack resistance, cut resistance and tear strength, and when a polyurethane product is once flawed, the flaw rapidly grows up under a severe use condition to give a fatal blow to the product. In order to obviate the above described drawbacks of polyurethane, the following methods have hitherto been proposed, i.e., a method wherein a plasticizer is added to a polyurethane prepolymer, and a method wherein a curative (chain extender) is added to a polyurethane prepolymer in an amount of not less than equivalent based on the amount of isocyanate groups in the prepolymer. However, in the former method which uses a plasticizer, the curing and chain extending reactions of the polyurethane prepolymer are often adversely affected, and further the physical properties of the resulting polyurethane always considerably decrease. The latter method, wherein polyamine or polyol is added to a polyurethane prepolymer in an amount of not less than chemical equivalent based on the amount of isocyanate groups of the prepolymer to effect the curing and chain extension of the prepolymer, has been known for a long time as a method of obtaining a polyurethane having an improved flex crack resistance. However, polyamines and polyols, which give a high strength to polyurethane, are expensive. Particularly, polyamines have problems in toxicity to human body, particularly in carcinogenecity. Moreover, the use of a large amount of such chain extenders shortens the pot life at the casting, and often causes difficulties in the casting operation. Accordingly, it is desirable to decrease the amount of chain extender as much as possible. This fact is clearly contrary to the commercial demand for obtaining polyurethane having high strength, flex crack resistance, cut resistance and tear strength.

SUMMARY OF THE INVENTION

It is, therefore, an object of the present invention to solve the above mentioned drawbacks in the prior art and to produce easily polyurethane products having an improved flex crack resistance.

It is another object of the present invention to produce polyurethane products having improved cut resistance and tear strength.

The present invention provides a method of producing polyurethane products having an improved flex crack resistance, which comprises curing a mixture of (a) a polyurethane prepolymer having terminal isocyanate groups and (b) at least one curative selected from the group consisting of polyamines and polyols to prepare a polyurethane product, and heat treating the polyurethane product at a temperature of 60°–180° C for 1–30,000 minutes under an atmosphere having an absolute humidity of at least 2%.

According to the present invention, the flex crack resistance, cut resistance and tear strength of polyurethane product can be remarkably improved without shortening the pot life and affecting adversely the creep property by using a small amount of curative.

Further, in the present invention, the use amount of curatives, such as polyamine and polyol, can be decreased while maintaining the high level of the physical properties of polyurethane products, and therefore the present invention is excellent in the low production cost of polyurethane and in the prevention of toxicity to the human body.

DESCRIPTION OF THE PREFERRED EMBODIMENTS

As the polyurethanes to be used in the present invention, there may be mentioned polyurethanes obtained by a so-called prepolymer process, wherein a polyurethane prepolymer having a terminal isocyanate group is reacted with a curative, such as polyamine, polyol or the like.

The polyurethane prepolymer having a terminal isocyanate group, used as component (a) in the present invention, is a compound having an average molecular weight of 800–20,000, preferably 2,000–5,000, which is obtained by reacting a polyether, a polyester or an unsaturated hydrocarbon, each having a terminal active hydrogen, with a molar excess of an organic polyisocyanate.

The polyether having a terminal active hydrogen, polyester having a terminal active hydrogen and unsaturated hydrocarbon having a terminal active hydrogen mean a polyether, polyester and unsaturated hydrocarbon, each having, at the terminal, functional group, such as hydroxyl, amino, imino, carboxyl and mercapto groups and the like, which have active hydrogen reactive with an isocyanate group.

As polyethers having terminal active hydrogen, there may be used polyoxyalkylene polyols, such as polyoxytetramethylene glycol, polyoxyethylene glycol, polyoxypropylene glycol, polyoxybutylene glycol, polyoxyamylene glycol, polyoxypropylene triol and the like; polyepihalohydrins, such as polyepichlorohydrin and the like; polyoxystyrene glycol; polyacetals produced by the condensation of butanedioxyethyl glycol or diethylene glycol with formaldehyde; polyoxyalkylene dicarboxylic acid, polyoxyalkylene dithiol, polyoxyalkylene diamine; and polymer polyols obtained by chain extending the above described polyethers with diisocyanate.

Among them, polyoxyalkylene polyol is preferable, and polyoxytetramethylene glycol or a chain extended product thereof is particularly preferable.

As polyesters having terminal active hydrogen, there may be used hydroxypolyesters obtained by reacting polybasic carboxylic acids, such as oxalic acid, malonic acid, succinic acid, glutaric acid, adipic acid, pimeric acid, cork acid, azelaic acid, sebacic acid, brassylic acid, thapsic acid, fumaric acid, glutamic acid, α-hydromuconic acid, β-hydromuconic acid, α-butyl-α-ethyl-glutaric acid, α,β-diethyl succinic acid, phthalic acid, isophthalic acid, terephthalic acid, hemmellitic acid, trimesic acid, prehnitic acid, benzene pentacarboxylic acid, trimellitic acid, mellophanic acid, pyromellitic acid, 1,4-cyclohexane dicarboxylic acid, 1,3,5-benzene tricarboxylic acid, 3,4,9,10-perylene tetracarboxylic acid, and their analogues, with polyols, such as ethylene glycol, propylene glycol, propane-1,2-diol, propane-1,3-diol, allyloxy propane diol, butane-1,4-diol, butane-1,3-diol, butane-2,3-diol, butane-2,4-diol, butane-dioxyethyl glycol, butene-1,4-diol, butyne-1,4-diol, pentane-1,4-diol, pentane-1,5-diol, hexane-1,6-diol, decane-1,10-diol, dodecane-1,12-diol, octadecane-7,18-diol, 4,4'-dihydroxy dicyclohexyl methane, 4,4'-dihydroxy dicyclohexyl dimethyl methane, bis-2-hydroxyethyl terephthalate, xylylene glycol, glycerine, castor oil, trimethylol propane, trimethylol ethane, hexane-1,2,6-triol, hexane-1,3,6-triol, pentaerythritol, sorbitol, mannitol, sugar, hydroquinone, 4,4'-dihydroxy diphenyl methane, 4,4'-dihydroxy diphenyl dimethyl methane, resorcinol, thiodiglycol and a glycol of the formula

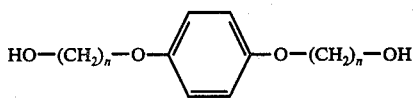

wherein n is 1–4, and their analogues and mixtures.

Preferably there is used dihydroxypolyethylene adipate.

The term hydroxy polyester includes polyhydroxy polyesteramides obtained by adding organic amines, such as ethylenediamine, propylenediamine, ethanolamine and their analogues, or an aminoalcohol, to the above mentioned components. Moreover, polyesterether glycols, such as hydroxypolyester, poly(ethylenetetramine) adipate, polydiethylene adipate and the like of the lactone series and lactone copolymer series, may be used.

As unsaturated hydrocarbons having terminal active hydrogen, there may be used polybutadiene glycol, styrene-butadiene copolymer glycol, polyisoprene glycol, acrylonitrile-butadiene copolymer glycol and the like.

As organic polyisocyanates used to react with the above described active hydrogen, there may be used aliphatic diisocyanates, such as ethane diisocyanate, propane diisocyanate, butene diisocyanate, butane diisocyanate, thiodiethyl diisocyanate, pentane diisocyanate, β-methylbutane diisocyanate, hexane diisocyanate, ω,ω'-dipropylether diisocyanate, thiodipropyl diisocyanate, heptane diisocyanate, 2,2-dimethyl pentane diisocyanate, 3-methoxy hexane diisocyanate, octane diisocyanate, 2,2,4-trimethyl pentane diisocyanate, nonane diisocyanate, decane diisocyanate, 3-butoxy hexane diisocyanate, 1,4-butylene glycol dipropyl ether-ω,ω'-diisocyanate, undecane diisocyanate, dodecane diisocyanate, thiodihexyl diisocyanate, dimer acid diisocyanate, trans vinylene diisocyanate, lysine diisocyanate methyl ester, 1,3- and 1,4-xylene diisocyanates, trimethyl hexamethylene diisocyanate, ω,ω'-diisocyanate-1,4-diethyl benzole, ω,ω'-diisocyanate-1,4-dimethyl naphthalene, ω,ω'-diisocyanate-1,5-dimethyl naphthalene, ω,ω'-diisocyanate-n-propylbiphenyl and their mixtures; alicyclic diisocyanates, such as ω,ω'-diisocyanate-1,2-dimethylcyclohexane, 1-methylcyclohexane-2,4-diisocyanate, decaline-1,5-diisocyanate, ω,ω'-diisocyanate-1,4-dimethylcyclohexane, ω,ω'-diisocyanate-1,4-dimethylcyclohexane, 1-ω-methyl isocyanate-2-ω-n-propyl isocyanate-3,5-dimethylcyclohexane, 1,3- and 1,4-cyclohexyl diisocyanates, methylene-bis(4-cyclohexyl isocyanate), isophorone diisocyanate and their mixtures; aromatic diisocyanates, such as tolylene-2,4-diisocyanate, tolylene-2,6-diisocyanate, tolylene-2,5-diisocyanate, tolylene-3,5-diisocyanate, 1,3-dimethylbenzole-2,4-diisocyanate, 1,3-dimethylbenzole-4,6-diisocyanate, 1,4-dimethylbenzole-2,5-diisocyanate, 1-ethylbenzole-2,4-diisocyanate, 1-isopropylbenzole-2,4-diisocyanate, diethylbenzole diisocyanate, diisopropylbenzole diisocyanate, metaphenylene diisocyanate, paraphenylene diisocyanate, 1,4-, 1,5-, 2,6- and 2,7-naphthalene diisocyanates, 1,1'-dinaphthyl-2,2'-diisocyanate, 2,4'- and 4,4'-biphenyl diisocyanates, diphenyl methane-4,4'-diisocyanate, diphenyl dimethyl methane-4,4'-diisocyanate, cyclohexyl-di(4-isocyanatephenyl)methane, 3,3'- and 4,4'-benzophenone diisocyanates, α,β-diphenylethane-2,4-diisocyanate, 3-nitro triphenyl methane-4,4'-diisocyanate, 4-nitro triphenyl methane-4,4'-diisocyanate, diphenyl ether-4,4'-diisocyanate, diphenyl sulfide-4,4'-diisocyanate, stilbene-4,4'-diisocyanate, dibenzyl-4,4'-diisocyanate, and alkyl, alkoxy, halogen or nitro substituted derivatives thereof, such as 3,3'-dimethyl biphenyl-4,4'-diisocyanate, 3,3'-dimethoxy biphenyl-4,4'-diisocyanate, 2-nitro biphenyl-4,4'-diisocyanate, dichloro biphenyl-4,4'-diisocyanate, 3,3'-dimethyl diphenyl methane-4,4'-diisocyanate, 2,5,2',5'-tetramethyl diphenyl methane-4,4'-diisocyanate, 3,3'-dimethoxy diphenyl methane-4,4'-diisocyanate, 4,4'-dimethoxy phenyl methane-3,3'-diisocyanate, 4,4'-diethoxy diphenyl methane-3,3'-diisocyanate, 2,2'-dimethyl-5,5'-dimethoxy diphenyl methane-4,4'-diisocyanate, 3,3'-dichloro diphenyl dimethyl methane-4,4'-diisocyanate, 3,3'-dichloro diphenyl methane-4,4'-diisocyanate and their mixtures; and polyisocyanates, such as 1-methyl benzole-2,4,6-triisocyanate, 1,3,5-trimethylbenzole-2,4,6-triisocyanate, naphthalene-1,3,7-triisocyanate, biphenyl-2,4,4'-triisocyanate, diphenyl methane-2,4,4'-triisocyanate, 3-methyl diphenyl methane-4,6,4'-triisocyanate, triphenyl methane-4,4',4''-triisocyanate, diphenyl ether-2,4,4'-triisocyanate, dicyclohexyl methane-2,4,4'-triisocyanate, triisocyanate phenyl thiophosphate, polymethylenepolyphenyl isocyanate having the formula

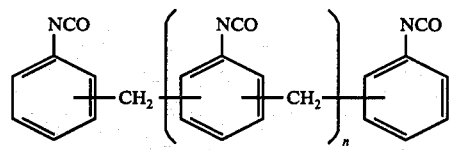

where n is 1–6, and their mixtures.

Among them, tolylene-2,4-diisocyanate, tolylene-2,6-diisocyanate, 1,5-naphthalene diisocyanate, diphenyl-4,4'-diisocyanate, diphenylmethane-4,4'-diisocyanate, hexane diisocyanate, cyclohexyl-1,3- and -1,4-diisocyanates, methylene bis(4-cyclohexyl isocyanate), 1,3- and 1,4-xylene diisocyanates, 1-methylcyclohexane-2,4-diisocyanate, decaline-1,5-diisocyanate, 3,3'-dimethyl biphenyl-4,4'-diisocyanate and their mixtures are preferable.

As component (b) in the present invention, a curative selected from polyamines and polyols may be used.

As the polyamine, there may be used 4,4'-methylene bis(2-chloroaniline), methylene dianiline, methylene bis-2-methoxyaniline, 2,2',5-trichloro-4,4'-methylene diamine, o-phenylenediamine, m-phenylene diamine, p-phenylene diamine, 2,6-dichloro-p-phenylene diamine, tolylene-2,4-diamine, toluidine, dianisidine, diphenylether-4,4'-diamine, 4,4'-diphenyl diamino sulfone, 3,3'-diphenyl diamino sulfone, naphthalene-1,5- diamine, aromatic diamines represented by the formula,

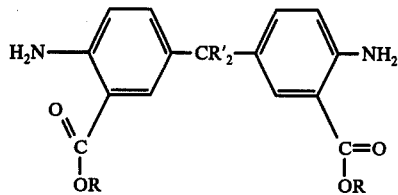

wherein R represents a radical selected from the class of —CH$_3$, —C$_2$H$_5$, —C$_3$H$_7$, —C$_4$H$_9$, —C$_6$H$_{13}$, —C$_8$H$_{17}$,

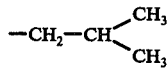

and —CH(CH$_3$)—(CH$_2$)$_3$—CH$_3$ and R' represents a radical selected from the group of —H, —CH$_3$, —C$_4$H$_9$ and —C$_6$H$_{13}$, aromatic diamines represented by the formula,

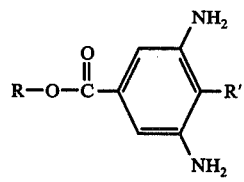

wherein R represents a radical selected from the group of —CH$_3$, —C$_2$H$_5$, —C$_3$H$_7$, —nC$_4$H$_9$, —iC$_4$H$_9$, —(CH$_2$)$_2$—OCH$_3$,

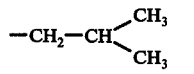

—C$_{18}$H$_{37}$ and —CH$_2$—CH(C$_2$H$_5$)—(CH$_2$)$_3$—CH$_3$ and R' represents a radical selected from the group of —CH$_3$, —C$_2$H$_5$, —C$_3$H$_7$, iC$_4$H$_9$ and halogen; and aromatic diamines, such as 2,4-diamino cumene, m-tolylene diamine, p-chloro-o-phenylene diamine, o-chloro-p-phenylene diamine, and their analogues and mixtures, and aliphatic polyamine, such as hydrazine, ethylene diamine, trimethylene diamine, diethylene triamine, hexamethylene-1,6-diamine, propylene diamine, piperazine and their mixtures. As the polyol, there may be used ethylene glycol, propylene glycol, propane-1,2-diol, propane-1,3-diol, allyloxypropane-diol, butane-1,4-diol, butane-1,3-diol, butane-2,3-diol, butane-2,4-diol, butane dioxyethyl glycol, butene-1,4-diol, butyne-1,4-diol, pentane-1,4-diol, pentane-1,5-diol, hexane-1,6-diol, decane-1,10-diol, dodecane-1,12-diol, octadecane-1,18-diol, 4,4'-dihydroxy dicyclohexyl methane, 4,4'-dihydroxy dicyclohexyl dimethyl methane, bis-2-hydroxyethyl terephthalate, xylylene glycol, glycerine, castor oil, trimethylol propane, trimethylol ethane, hexane-1,2,6-triol, hexane-1,3,6-triol, pentaerythritol, sorbitol, mannitol, sugar, hydroquinone, 4,4'-dihydroxy diphenyl-methane, 4,4'-dihydroxy diphenyl dimethyl methane, resorcinol, thiodiglycol, bis($\beta,\beta'$-hydroxy ethoxy)naphthalene, glycols represented by the formula,

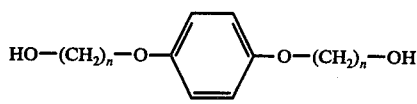

wherein n is from 1 to 4, their analogues and mixtures.

Among them, 4,4'-methylene bis(2-chloroaniline), methylene dianiline, naphthalene-1,5-diamine, phenylene diamine, tolylene-2,4-diamine, diphenylether-4,4'-diamine, hydrazine, ethylene diamine, 2,6-dichlorophenylene diamine, hexamethylene-1,6-diamine, piperazine, compounds represented by the formula,

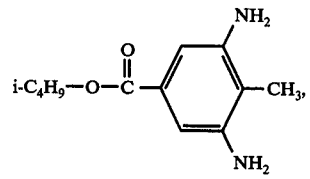

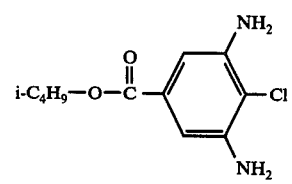

and

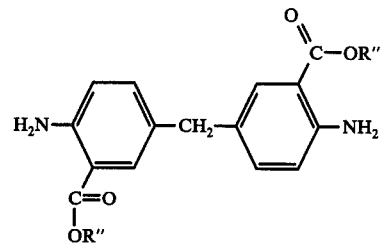

wherein R" is a radical selected from the group of —CH$_3$, —C$_2$H$_5$, —C$_3$H$_7$ and —C$_4$H$_9$, ethylene glycol, 1,3-propylene glycol, 1,4-butane diol, trimethylolpropane, bis($\beta,\beta'$-hydroxy ethoxy)naphthalene, bis($\beta,\beta'$-hydroxy ethoxy)benzene, and their mixtures are preferable.

These curatives serve as a chain extender or a cross-linking agent or both of them.

In general, polyurethane products are produced in the following manner. The polyurethane prepolymer of component (a) is previously defoamed under reduced pressure with heating, and a stoichiometric amount of melted or liquid polyamine or polyol is added thereto. The resulting mixture is immediately cast into a mold, and heated under atmospheric pressure or under pressure to effect the curing and chain extending reactions of the prepolymer, whereby the polyurethane product is obtained.

In the present invention, it is not always necessary that the polyurethane product is produced by the above described prepolymer process. For example, there may be used polyurethane prepared by a so-called one-shot molding process, wherein a mixture of a compound having terminal active hydrogen and a diisocyanate is heated, if necessary, in the presence of a curative, such as a polyol or polyamine, to effect curing and chain-extending reactions in one step.

The polyurethanes to be used in the present invention are ones obtained by any one of the above described methods in such a mixing ratio of starting materials that the equivalent ratio of the active hydrogen of the curative to the isocyanate group in the starting material mixture is 0.5-1.1, preferably 0.6-1.0.

The above described polyurethane may contain commonly used additives, such as a reaction accelerator, antioxidant, ultraviolet ray absorber, plasticizer, filler, coloring agent and a relatively small amount of short fiber and reinforcing agent.

In general, the polyurethane product taken out from the mold after the casting under the above described condition is used as such, or is further subjected to a heat treatment, called a post-cure, at about 100° C for 3-24 hours. However, the present invention carries out a novel treatment, wherein the polyurethane product, after taken out from mold or after the post-cure, is heat treated under a humidified atmosphere. In the present invention, the heat treatment under a humidified atmosphere is carried out at a temperature of 60°-180° C, preferably 80°-140° C. When the treating temperature is lower than 60° C, a long treating time is required in order to obtain a satisfactory result, and treatment at such low temperature is not effective and economic. While, when the treating temperature is higher than 180° C, the bonding of main chain in the polyurethane is often broken. The treating time is not particularly limited, and is shorter or longer as the treating temperature is higher or lower, respectively. The treating time is generally 1-30,000 minutes, preferably 60-18,000 minutes, and more preferably 60-3,000 minutes. A treatment of longer than 30,000 minutes under humidified atmosphere has substantially no merit in the effect and economy.

The humidity necessary for carrying out the heat treatment of the present invention can be obtained by adding moisture to air by an optional method. For example, a satisfactory result can be obtained by adding a small amount of moisture to air. The heat treatment of the present invention is generally carried out under an absolute humidity of at least 2%, preferably at least 3%, more preferably 5-80%. The effect of humidity increases up to an absolute humidity of 80%, but when the humidity exceeds 80%, the increase of the effect of humidity is small.

The term "absolute humidity" herein used means absolute humidity on a weight basis, and is defined by the weight of water vapor accompanied by 1 Kg of dry air (Kg/kg (dry air)) or by the weight percentage (%) of the water vapor (Encyclopaedia Chimica, Vol. 4, page 347 (Kyoritsu Shuppan K.K.)). For example, an atmosphere having a relative humidity of as high as 90% at room temperature (25° C) has an absolute humidity of about 1.9%, and even when this atmosphere is kept to one atmospheric pressure and heated up to 110° C, the value of the absolute humidity does not substantially change. The heat treatment of the present invention may be carried out under not less than or less than one atmospheric pressure. The treating temperature, humidity and treating time are determined depending upon the quality demanded in the final product, the treating installation, the treating efficiency and the like.

The following examples are given for the purpose of illustration of this invention and are not intended as limitations thereof.

COMPARATIVE EXAMPLE 1

One hundred grams of a polyether type polyurethane prepolymer having terminal isocyanate group and a number average molecular weight of about 3,000 (trademark: Coronate 4080, made by Nippon Polyurethane Co., reaction product of polyoxytetramethylene glycol with tolylene diisocyanate) was defoamed at about 80° C for about 2 hours with stirring under a reduced pressure. Melted 4,4'-methylene-bis(2-chloroaniline) was mixed with the above defoamed polyurethane prepolymer in a mixing ratio that the equivalent ratio of the active amino group in the amine to the isocyanate group in the prepolymer was 0.6, 0.82, 0.90, 1.0 or 1.1, and the resulting mixture was cast into a mold of 15cm×15cm×0.2cm. After the mold was covered with glass, the mixture in the mold was cured at 100° C for 3 hours in an air oven to obtain polyurethane elastomer sheets having a thickness of 0.2 cm. The flex crack resistance and tear strength of the resulting sheet are shown in the following Table 1.

The flex crack resistance and tear strength of the sheet were measured in the following manner.

1. Flex crack resistance:

A dumbbell type test piece having a length of 5 cm, a width of 0.4 cm and thickness of 0.2 cm is punched out from the sheet by means of a DIN No. 3 chip, and the test piece is repeatedly elongated in its length direction up to 2 times of its original length at a rate of 300 times/min at room temperature by means of a De Mattia type fatigue tester. The number of elongation times until the test piece is broken is counted, which is the flex crack resistance.

2. Tear strength:

A strip-shaped test piece having a length of 8 cm, a width of 1 cm and a thickness of 0.2 cm is cut out from the sheet. A cut having a length of 0.2 cm is made to the test piece from the side at the center portion of the length of the test piece in a direction perpendicular to the longitudinal direction of the test piece. The test piece is elongated at a rate of 50 mm/min at room temperature by means of an Instron type tensile tester until the test piece is broken. The stress in the test piece at the break is measured. The tear strength is shown by the stress per initial cross-sectional area of the test piece.

Hereinafter, in the specification, the term "untreated" may be used. The term "untreated" means the state of polyurethane, which is obtained by the curing in a mold as described in this Comparative Example 1 and is not yet subjected to the after-cure as described in the following Comparative Example 2 and to the heat treatment under a humidified atmosphere according to the present invention.

Table 1

| —NH$_2$/—NCO equivalent ratio | Polyurethane sheet obtained by the curing in a mold (untreated sheet) | |
|---|---|---|
| | Tear strength (Kg/cm) | Flex crack resistance (number of elongation times) |
| 0.6 | 7 | 100 |
| 0.82 | 10 | 500 |
| 0.90 | 14 | 13,400 |
| 1.0 | 32 | 97,230 |
| 1.1 | 46 | at least 200,000 |

It can be seen from Table 1 that the flex crack resistance and tear strength of polyurethane depend highly upon the equivalent ratio of the isocyanate group in the polyurethane prepolymer to the amino group in the curative, and when the —$NH_2$/—NCO equivalent ratio is less than 1.0, the physical properties of the polyurethane are poor, but when the ratio is not less than 1.0, the physical properties are remarkably high.

COMPARATIVE EXAMPLE 2

It is empirically known that, when a polyurethane elastomer obtained by the curing in a mold is taken out from the mold and further heat treated at about 100° C for 10–30 hours in an air oven, the physical properties of the polyurethane elastomer are somewhat improved. Such heat treatment is called an after-cure, post-cure or maturation. In order to ascertain the effect of this after-cure, the following experiment was carried out. a polyurethane elastomer prepared by the curing in a mold in the same manner as described in Comparative Example 1 was heat treated in air at 110° C (absolute humidity: less than 2.0%) for 16 hours. The obtained results are shown in the following Table 2 together with the results obtained in Comparative Example 1.

Table 2

| | Untreated | | Heat treated in air at 110° C for 16 hrs. | |
|---|---|---|---|---|
| —$NH_2$/—NCO equivalent ratio | Tear strength (Kg/cm) | Flex crack resistance (number of elongation times) | Tear strength (Kg/cm) | Flex crack resistance (number of elongation times) |
| 0.6 | 7 | 100 | 11 | 2,200 |
| 0.82 | 10 | 500 | 15 | 5,830 |
| 0.90 | 14 | 13,400 | 22 | 23,250 |

It can be seen from Table 2 that when untreated polyurethane having an —$NH_2$/—NCO equivalent ratio of less than 1.0 is after-cured for a long period of time, its flex crack resistance and tear strength are somewhat improved. However, it can be seen from the comparison of Table 1 with Table 2 that the flex crack resistance and tear strength improved by the after-cure are still considerably inferior to those of untreated polyurethane having an —$NH_2$/—NCO equivalent ratio of not less than 1.0. Moreover, a very high treating temperature and a very long treating time are required in order to improve the flex crack resistance and tear strength up to fairly high values, and therefore the after-cure method has further drawbacks in the low efficiency for the improvement of these properties and in the high fuel cost.

EXAMPLE 1

In the same manner as described in Comparative Example 1, 4,4'-methylene-bis(2-chloroaniline) as a curative was mixed with a polyurethane prepolymer (Coronate 4080) in a mixing ratio such that the equivalent ratio of the amino group in the amine to the isocyanate group in the prepolymer was 0.6, 0.82, 0.90, 1.0 or 1.1, and polyurethane elastomer sheets were prepared. The resulting sheets were heat treated at 110° C for 16 hours in a humidified air having an absolute humidity of 20%. The flex crack resistance and tear strength of the above treated polyurethane elastomer sheets are shown in the following Table 3 together with those of the sheet (untreated sheet) in Comparative Example 1 and of the heat treated sheet in an air oven in Comparative Example 2.

Table 3

| | Untreated | | Heat treated in air at 110° C for 16 hrs. | | Heat treated in humidified air, humidity 20%, at 110° C for 16 hrs. | |
|---|---|---|---|---|---|---|
| —$NH_2$/—NCO equivalent ratio | Tear strength (Kg/cm) | Flex crack resistance (number of elongation times) | Tear strength (Kg/cm) | Flex crack resistance (number of elongation times) | Tear strength (Kg/cm) | Flex crack resistance (number of elongation times) |
| 0.6 | 7 | 100 | 11 | 2,200 | 20 | 50,000 |
| 0.82 | 10 | 500 | 15 | 5,830 | 35 | 101,200 |
| 0.90 | 14 | 13,400 | 22 | 23,250 | 41 | 187,000 |
| 1.0 | 32 | 97,230 | — | — | 45 | at least 200,000 |
| 1.10 | 46 | at least 200,000 | — | — | 52 | at least 200,000 |

It can be understood from Table 3 that when polyurethane elastomer sheet having an —$NH_2$/—NCO equivalent ratio of not more than 1.0 is heat treated in humidified air, the flex crack resistance and tear strength of the sheet are remarkably improved, and further the flex crack resistance and tear strength improve more remarkably than the case of air oven treatment and approach the values of polyurethane elastomer sheet having an —$NH_2$/—NCO equivalent ratio of more than 1.0. While even when the sheet having an —$NH_2$/—NCO ratio of more than 1.0 is heat treated in humidified air, the improvement of the flex crack resistance and tear strength is smaller than that in the case where the sheet having an —$NH_2$/—NCO ratio of not more than 1.0 is heat treated in humidified air.

EXAMPLE 2

In the exactly same manner as described in Comparative Example 1, 4,4-methylene-bis(2-chloroaniline) was mixed with a polyurethane prepolymer, Coronate 4080, in a mixing ratio that the equivalent ratio of the amino group in the amine to the isocyanate group in the prepolymer was 0.82, and polyurethane elastomer sheets were produced. The resulting sheets were heat treated at 110° C for 5 hours in an oven in a humidified air having an absolute humidity of 2, 5, 20, 40, or 60%. The flex crack resistance of the above treated sheets were measured in the exactly same manner as described in Comparative Example 1. The obtained results are shown in the following Table 4.

Table 4

| Absolute humidity (%) | Flex crack resistance (number of elongation times) |
| --- | --- |
| 0 | 2,000 |
| 2 | 4,000 |
| 5 | 8,820 |
| 20 | 50,000 |
| 40 | 70,000 |
| 60 | 73,500 |

It can be seen from Table 4 that the flex crack resistance of polyurethane is remarkably increased with the increase of the humidity in the heat treatment atmosphere under a certain temperature and a certain treating time. Further, it is anticipated that when the humidity in the oven if further increased, the flex crack resistance of polyurethane is increased in a very short period of time.

EXAMPLE 3

In the exactly same manner as described in Comparative Example 1, 4,4'-methylene-bis(2-chloroaniline) was mixed with Coronate 4080 in a mixing ratio such that the equivalent ratio of the amino group in the amine to the isocyanate group in the polyurethane prepolymer was 0.82, and polyurethane elastomer sheets were prepared. The resulting sheets were heat treated in air or in a humidified air having an absolute humidity of 20%. The following Table 5 shows the flex crack resistance of the above heat treated sheets.

Table 5

| Treating temperature (° C) | Atmosphere | Treating time (hrs.) | Flex crack resistance (number of elongation times) |
| --- | --- | --- | --- |
| 80 | air | 0 | 500 |
|  |  | 10 | 512 |
|  |  | 24 | 522 |
|  | humidified air | 0 | 500 |
|  |  | 10 | 753 |
|  |  | 24 | 5,860 |
| 120 | air | 0 | 500 |
|  |  | 2 | 11,550 |
|  |  | 5 | 32,500 |
|  | humidified air | 0 | 500 |
|  |  | 2 | 85,632 |
|  |  | 5 | 223,500 |
| 140 | air | 0 | 500 |
|  |  | 0.3 | 8,000 |
|  |  | 0.85 | 22,000 |
|  | humidified air | 0 | 500 |
|  |  | 0.3 | 78,450 |
|  |  | 0.85 | 253,500 |

It can be seen from Table 5 that the improvement of flex crack resistance by the heat treatment in humidified air is more remarkable than the improvement thereof by the heat treatment in air at any treating temperature. Further, the time required for the improvement of flex crack resistance becomes considerably short with the rising of treating temperature.

EXAMPLE 4

In the exactly same manner as described in Comparative Example 1, a polyester type polyurethane prepolymer having terminal isocyanate group and a number average molecular weight of about 2,200 (trademark: Cyanaprene A-85, made by American Cyanamide Co., reaction product of polyethylene adipate with tolylene diisocyanate) was defoamed under a reduced pressure, and mixed with 4,4'-methylene-bis(2-chloroaniline) in a mixing ratio such that the equivalent ratio of the amino group in the amine to the isocyanate group in the prepolymer was 0.92, and the resulting mixture was case into a mold of 15 cm × 15 cm × 0.2 cm. The mixture in the mold was heated at 100° C for 3 hours to obtain a polyurethane elastomer sheet. The sheet was heat treated at 110° C for 16 hours in a humidified air having an absolute humidity of 20%.

For comparison, the above obtained polyurethane elastomer sheet was heat treated at 110° C for 16 hours in air.

The flex crack resistance of the above treated sheets and an untreated sheet was measured in the same manner as described in Comparative Example 1. The obtained results are shown in the following Table 6.

Table 6

| Atmosphere | Flex crack resistance (number of elongation times) |
| --- | --- |
| Untreated | 25,500 |
| Air | 40,000 |
| Humidified air | at least 250,000 |

It can be seen from Table 6 that the present invention is applicable regardless of the structure of the main chain of polyurethane prepolymer.

EXAMPLE 5

In the exactly the same manner as described in Comparative Example 1, a polyether type polyurethane prepolymer, Coronate 4080, was defoamed under a reduced pressure and mixed with 1,4-butane diol in a mixing ratio such that the equivalent ratio of the hydroxyl group in the diol to the isocyanate group in the prepolymer was 0.95, and the resulting mixture was heated at 100° C for 20 hours to prepare a polyurethane elastomer sheet. Then, the sheet was heat treated at 110° C for 16 hours in a humidified air having an absolute humidity of 20%.

For comparison, the above obtained polyurethane elastomer sheet was heat treated at 110° C for 16 hours in air.

The flex crack resistance of the above treated sheets and an untreated sheet was measured in the same manner as described in Comparative Example 1. The obtained results are shown in the following Table 7.

Table 7

| Atmosphere | Flex crack resistance (number of elongation times) |
| --- | --- |
| Untreated | 5,830 |
| Air | 20,500 |
| Humidified air | 383,000 |

It can be seen from Table 7 and the result of Examples 1-4 that the present invention can be effectively carried out regardless of the kind of curative used for curing polyurethane prepolymer and for extending the chain thereof.

EXAMPLE 6

In the exactly same manner as described in Comparative Example 1, 4,4'-methylene-bis(2-chloroaniline) was mixed with a polyurethane prepolymer, Coronate 4080, in a mixing ratio such that the equivalent ratio of the amino group in the amine to the isocyanate group in the prepolymer was 0.82 or 1.1, and the resulting mixture was cast into a mold and cured therein to prepare polyurethane elastomer sheets. The resulting polyurethane elastomer sheets were subjected to the treatments shown in the following Table 8. The above treated sheets were subjected to a creep test under a stress of 20 Kg/cm² at room temperature or at 80° C.

Table 8

| —NH$_2$/—NCO equivalent ratio | Treating condition | Creep (%) room temp. | Creep (%) 80° C | Modulus under 10% elongation at room temp. (Kg/cm²) |
| --- | --- | --- | --- | --- |
| 0.82 | In humidified air, absolute humidity 20%, at 110° C for 16 hours | 44 | 41 | 170 |
| 1.1 | Untreated | 48 | 67 | 170 |

It can be seen from Table 8 that the polyurethane elastomer having an —NH$_2$/—NCO equivalent ratio of 0.82, which had been obtained by the heat treatment in humidified air according to the present invention, has substantially the same physical properties, such as elastic modulus and the like, as those of the conventional polyurethane elastomer having an equivalent ratio of 1:1, which has not been subjected to the heat treatment in humidified air. Particularly, the former sheet has more improved creep property than that of the latter sheet at high temperature range.

What is claimed is:

1. A method of producing a polyurethane product having improved flex-crack resistance, which comprises the steps of:
   (1) curing a mixture of:
      (a) an isocyanate terminated polyether type polyurethane prepolymer having a molecular weight 800–20,000 and
      (b) a polyamine curative in an amount of 0.6–0.9 equivalent per isocyanate equivalent of said prepolymer,
   (2) post-curing the reaction product from step (1), and
   (3) subsequently heat treating the resultant article for 60–18,000 minutes under an atmosphere of a temperature of 80°–140° C and an absolute humidity of 5–80%.

2. The method according to claim 1, wherein said polyurethane prepolymer is a reaction product of polyethers having terminal active hydrogen with a molar excess of an organic polyisocyanate.

3. The method according to claim 1, wherein said polyurethane prepolymer is a reaction product of polyoxyalkylene polyols with a molar excess of an organic polyisocyanate.

4. The method according to claim 2, wherein said organic polyisocyanate is at least one compound selected from the group consisting of tolylene-2,4-diisocyanate and tolylene-2,6-diisocyanate.

5. The method according to claim 1, wherein the treating time of the polyurethane product is 60–3,000 minutes.

6. The method according to claim 1, wherein said post-cure is conducted at about 100° C for 3–24 hours.

7. The method according to claim 1, wherein said polyamine curative is 4,4'-methylene-bis(2-chloroaniline).

* * * * *